United States Patent [19]

Kotezawa et al.

[11] 4,062,016

[45] Dec. 6, 1977

[54] SIMULTANEOUS TELECOMMUNICATION BETWEEN RADIO STATIONS

[75] Inventors: Katsutaka Kotezawa; Toshimi Onodera; Setsuo Hayashi; Fujio Shimanuki, all of Funabashi, Japan

[73] Assignee: Chiba Communications Industries, Inc., Japan

[21] Appl. No.: 646,475

[22] Filed: Jan. 5, 1976

[30] Foreign Application Priority Data

Jan. 11, 1975 Japan .................................. 50-16272
Feb. 14, 1975 Japan .................................. 50-17087

[51] Int. Cl.² .............................................. H04B 1/56
[52] U.S. Cl. .................................... 343/178; 325/22; 343/179
[58] Field of Search ....................... 343/178, 179, 180; 325/21, 22; 307/221 C, 221 D

[56] References Cited

U.S. PATENT DOCUMENTS

| 3,283,074 | 11/1966 | Csicsatka | 325/22 |
| 3,460,040 | 8/1969 | Jacob | 343/178 |
| 3,784,847 | 1/1974 | Kurz et al. | 307/221 D |
| 3,827,052 | 7/1974 | Tanaka | 343/178 |

Primary Examiner—Robert L. Griffin
Assistant Examiner—Marc E. Bookbinder
Attorney, Agent, or Firm—Emrich, Root, O'Keeffe & Lee

[57] ABSTRACT

A radio communication system for simultaneous telecommunication between a calling station and a called station using a carrier of single frequency for carrying audio information, in which a time division pulse signal within the audio frequency range is generated for synchronous transmission and reception of the audio signals in these stations in time division fashion. The audio signals received at a station during one pulse interval are delayed and combined with the signal portion received during the one pulse interval to provide a composite signal comprised of the same audio signal in two successive pulse intervals. Voice control means are also provided so that the radio communication system can make continuous signal transmission and reception in time division fashion when audio information to be transmitted is applied to the microphone, and the system can be placed in the receiving mode when such input is not applied to the microphone.

14 Claims, 4 Drawing Figures

SIMULTANEOUS TELECOMMUNICATION BETWEEN RADIO STATIONS

BACKGROUND OF THE INVENTION

This invention relates to the art of simultaneous telecommunication between radio stations, and more particularly to a radio communication system for simultaneous telecommunication between radio stations, using a carrier of single frequency for carrying audio information signals, in which a time division pulse signal of low frequency is generated for the transmission and reception of the audio information signals in time division fashion, and the audio information signal received in time division fashion is reproduced in a unique manner to improve the intelligibility of the reproduced audio information.

In the exchange of information between a calling station and a called station by radio communication units using a carrier of single frequency, the operator in the called station manipulates the radio communication unit upon termination of transmission of a message from the calling station so that he can now transmit his message to the calling station. In such manner of information exchange, however, free conversations like those over a telephone line cannot be attained. In other words, the operator talking by the radio communication unit in the calling or called station cannot say yes or no while the other is talking. Further, at least one hand of the operator in each of the two stations is occupied for the exclusive purpose of switch-over of transmission and reception of audio information signals since such switch-over must be manually carried out. Thus, there has been a strong demand for a radio communication system for simultaneous telecommunication which is capable of automatic switch-over of transmission and reception of audio information signals. However, in the field of information exchange between radio stations, a radio communication system for simultaneous telecommunication capable of automatic switch-over of audio information signals transmitted from and received by radio communication units using a carrier of single frequency has not yet been realized for the reasons described in detail below.

A radio communication system for simultaneous telecommunication capable of automatic switch-over of audio information signals transmitted from and received by radio communication units using a carrier of single frequency can be realized and successfully put into practical use when the transmission and reception of the audio information signals in the calling station and the called station are carried out in synchronous fashion utilizing a time division pulse signal of high frequency. Such a system cannot however be realized due to the fact that a high frequency signal used in such manner for the purpose of time division transmission and reception does not inevitably fall within the limited frequency band prescribed in the laws including the Radio Law.

Resorting to time division utilizing a low frequency is thus the only method which can achieve the desired time division with a frequency which falls within the limited frequency band prescribed in the said laws. However, the time division with a low frequency results in extreme deterioration of the intelligibility of reproduced audio information due to the discontinuity of the audio information signal which results from the time division by the low frequency, and thus, difficulty is encountered in the realization of the desired simultaneous telecommunication. For the reasons above pointed out, it has heretofore been unable to realize simultaneous telecommunication using a carrier of single frequency and utilizing a time division signal of low frequency for the automatic switch-over of transmitted and received audio information signals.

BRIEF SUMMARY OF THE INVENTION

It is therefore a primary object of the present invention to provide a novel and useful radio communication system for simultaneous telecommunication which overcomes the difficulty above described and which can attain the desired exchange of information by radio communication units using a carrier of single frequency and a time division signal of low frequency for the automatic switch-over of transmitted and received audio information signals.

The present invention which attains the above object provides the following advantages owing to a unique arrangement as described in detail later. According to the radio communication system of the present invention using a carrier of single frequency, a time division pulse signal of low frequency is used for the automatic switch-over of transmitted and received audio information signals, and an audio delay element is incorporated in the system so that the audio signal demodulated by the receiver in the receiving station is substantially analogous to the original audio signal subject to modulation in the transmitting station. Therefore, the frequency of the time division pulse signal required for the simultaneous telecommunication between the stations can be selected to fall within the limited frequency band prescribed in the laws, and the transmitted audio signal can be reproduced with satisfactory intelligibility in the receiving station. Further, by virtue of the automatic switch-over of the transmitted and received audio information signals utilizing the time division pulse signal, the period of time required for the talking can be shortened and an increase in information exchanged can be achieved within a short period of time to provide a great improvement in the business efficiency. Furthermore, due to the fact that one half cycle of the time division pulse signal is used for the transmission or reception of audio information signals between the two stations and the other half cycle thereof is used for the reception or transmission of audio information signals between the two stations, a third station can easily intervene in the information exchange between the two stations during the available period of time corresponding to one of the half cycles. Moreover, this manner of transmission and reception of audio information signals in time division fashion is advantageous in that the amount of the message transmitted from the transmitting station can be reduced and the power consumption during the message transmission can be correspondingly reduced.

Another object of the present invention is to provide a radio communication system for simultaneous telecommunication which has a voice control function such that the transmitting and receiving operation according to the time division is carried out only when an audio signal input to the microphone appears in the transmitting mode, and the radio communication system is held in the receiving mode when such audio signal input does not appear.

The present invention which attains the above object provides the following advantages owing to a unique arrangement as described in detail later. When no audio signal to be transmitted appears in either the calling station or the called station, the radio communication system in each of the stations is automatically held in the receiving mode until an audio signal to be transmitted therefrom appears, and in response to the appearance of such audio signal, the transmitting mode and receiving mode occur alternately. Further, when audio signals to be transmitted appear almost simultaneously in both the calling station and the called station, synchronized operation of these stations takes place in a manner such that the one of the stations transmitting the audio signal later than the other is automatically placed in the receiving mode. Thus, the radio communication system in this specific station is placed in the receiving mode whenever the exchange of audio information is completed or the audio signal being transmitted is interrupted during the audio information exchange. This is advantageous in saving the electric power required for audio information transmission and in reducing the length of time occupied by the transmission of radio waves.

DETAILED DESCRIPTION OF THE INVENTION

Figure 1:
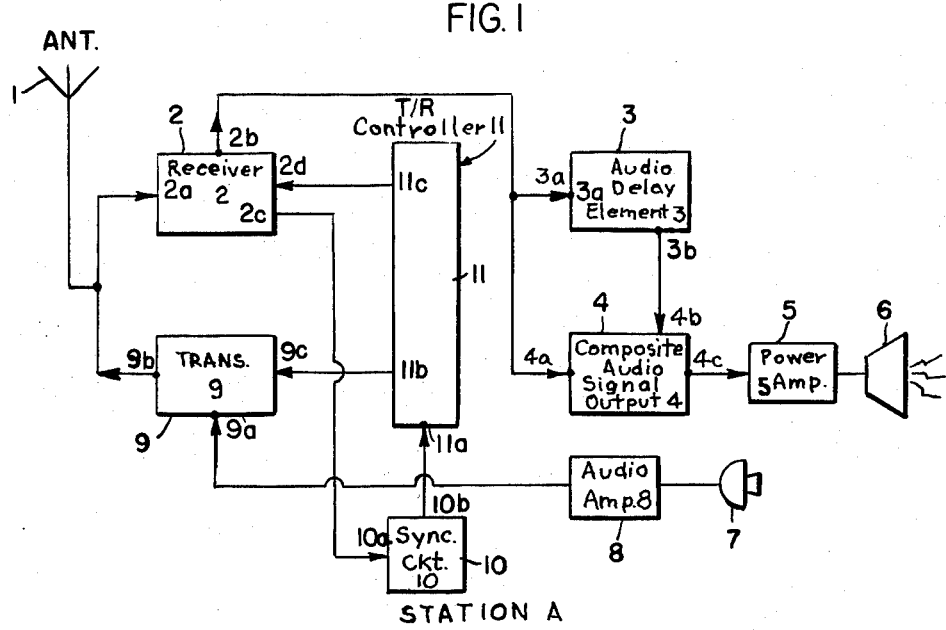
FIG. 1 is a block diagram of a preferred embodiment of the present invention and shows the structure of the radio communication system in one station.

FIG. 1 is a block diagram of a radio communication system preferably used for simultaneous telecommunication embodying one form of the present invention. The radio communication system shown in FIG. 1 is disposed at least in a calling station (referred to hereinafter as a station A) and a called station (referred to hereinafter as a station B). Referring to FIG. 1 showing the radio communication system in the station A, a signal transmitting route and a signal receiving route have a common antenna 1. This antenna 1 is connected in usual manner to the input terminal 2a of an FM (or AM) receiver 2 of known structure which is part of the signal receiving route. A received modulated signal is subject to detection in the receiver 2 and the audio signal thus obtained appears at the output terminal 2b of the receiver 2. The output terminal 2b of the receiver 2 is connected to the input terminal 3a of an audio delay element 3 and to one terminal 4a of a composite audio signal output circuit 4. This audio delay element 3 acts to delay the audio signal input by a predetermined delay time and may be a known bucket relay circuit or a bucket brigade device (BBD) consisting of a capacitor and a field effect transistor (FET). The composite audio signal output circuit 4 connected at one input terminal 4a thereof to the output terminal 2b of the receiver 2 may be a hybrid circuit comprising a two-input transformer. The other input terminal 4b of the composite audio signal output circuit 4 is connected to the output terminal 3b of the audio delay element 3. Thus, the audio signal output of the receiver 2 and the audio signal output of the audio delay element 3 are applied to the input terminals 4a, 4b of the composite audio signal output circuit 4, and a composite audio signal appears at the output terminal 4c of the composite audio signal output circuit 4 to be applied through a power amplifier 5 to a speaker 6. In the signal transmitting route, a microphone 7 is connected through an audio signal amplifier 8 to the input terminal 9a of an FM (or AM) transmitter 9 of known structure, and this transmitter 9 is connected at the output terminal 9b thereof to the antenna 1 in usual manner.

The radio communication system further includes synchronizing and time division pulse generating means. Referring to FIG. 1, the input terminal 10a of a synchronizing circuit 10 is connected to terminal 2c in the portion of the receiver 2 which is capable of detecting arrival of the transmitted modulated signal, that is, the input terminal 10a of the synchronizing circuit 10 is connected to the squelch circuit or AGC circuit when the receiver 2 is an FM receiver or an AM receiver. The operation of this synchronizing circuit 10 is such that the output signal of the squelch circuit or AGC circuit is amplified and rectified to obtain a digital signal (binary on/off signals) and this digital signal is applied as a trigger signal to a digital counter which counts clock pulses continuously for a predetermined period of time of 10 msec to 100 msec to produce a pulse used for synchronization. In other words, the synchronizing circuit 10 in the station B is generating a train of time division pulses when the stations A and B are initially placed in the transmitting mode and the receiving mode respectively, and upon arrival of the transmitted signals at the station B together with the carrier, the output signal of the squelch circuit or AGC circuit in the receiver 2 in the station B is applied to the synchronizing circuit 10 in the station B so that the synchronizing circuit 10 in the station B can operate in synchronism with that in the station A. A TTL circuit may be used as this synchronizing circuit 10. For the purpose of attaining synchronization, a pilot signal (synchronizing signal) may be incorporated in the modulated signal in usual manner. In such a case, the structure of the circuit will be slightly different from that shown in the block diagram of FIG. 1. However, any detailed description as to such modified circuit is unnecessary since such manner of synchronization is commonly known in the art. The output terminal 10b of the synchronizing circuit 10 is connected to the input terminal 11a of a transmitter — receiver controller 11. This transmitter-receiver controller 11 includes means, for example, a flip-flop which is inverted each time the pulse appearing after the counting operation for the predetermined period of time by the counter in the synchronizing circuit 10 is applied from the counter so that the time division pulses can appear at the output terminals 11b, 11c of the transmitter-receiver controller 11. This transmitter-receiver controller 11 is connected at the output terminals 11b, 11c thereof to the transmitter 9 and receiver 2 respectively to control the same. Specifically, output terminal 11c of the transmitter-receiver controller 11 is connected to the high-frequency amplifying state of the receiver 2 and the output terminal 11b is connected to the frequency multiplier in the transmitter 9.

The operation of the radio communication system shown in FIG. 1 will be described with reference to FIG. 2. Suppose, for example, that the radio communication system in the station A is in the transmitting mode and that in the station B is in the receiving mode.

Figure 2:
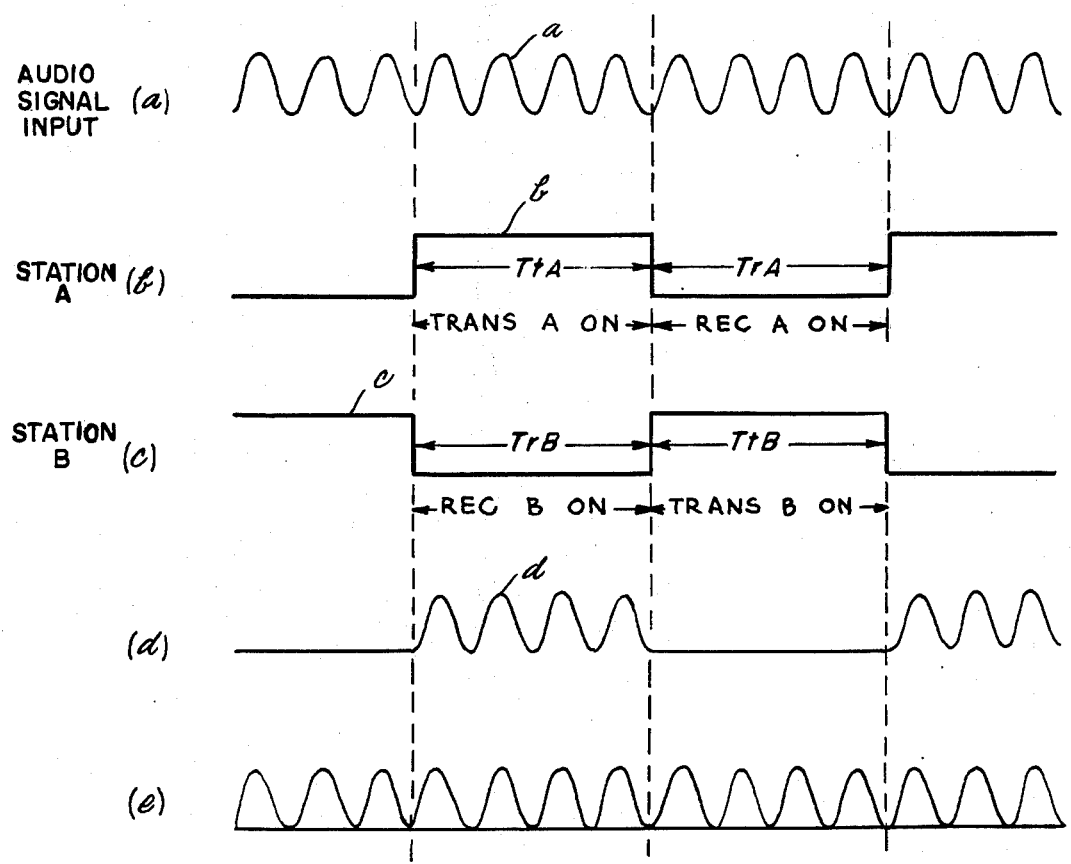
FIG. 2 shows waveforms appearing at various parts of the system shown in FIG. 1.

An audio signal having a waveform as shown in FIG. 2a appears at the output terminal of the microphone 7 in the station A to be applied to the transmitter 9 after being amplified by the audio amplifier 8. A modulated audio signal is applied from the transmitter 9 to the antenna 1 to be transmitted to the station B. At this time, the synchronizing circuit 10 and transmitter-receiver controller 11 in each of the radio communication systems in the stations A and B are applying a low-frequency pulse signal b (FIG. 2) consisting of pulses having a pulse width of 10 msec to 100 msec to the transmitter 9 and receiver 2 in the stations. Thus, in response to the application of this time division pulse signal b shown in FIG. 2b to the transmitter 9 and receiver 2 in the station A, the transmitter 9 and receiver 2 are alternately turned on and off. Similarly, in response to the application of the time division pulse signal C shown in FIG. 2c to the transmitter 9 and receiver 2 in the station B, the receiver 2 and transmitter 9 in station B are alternately turned on and off in synchronism with the transmitter 9 and receiver 2 in the station A. Thus, the transmitter 9 in the station A is energized only during each period of time corresponding to the pulse width TtA in which the time division pulse signal b takes the high level. The modulated audio signal a shown in FIG. 2a is interrupted during the subsequent time interval Tra whereby the signal output from transmitter A appears as a discontinuous signal as shown in FIG. 2d. This discontinuous signal waveform shown in FIG. 2d is transmitted from the antenna 1 in the station A toward the station B. In the space in FIG. 2d, that is, in the pulse interval TrA shown in FIG. 2b, the radio communication system in the station A is placed in the receiving mode, hence, that in the station B is placed in the transmitting mode.

In the station B, the receiver 2 is turned on during each period of time corresponding to the pulse width TrB (=TtA) in which the time division pulse signal c shown in FIG. 2c takes the low level. Therefore, the signal waveform of FIG. 2d transmitted from the station A is received and detected by the receiver 2 in the station B. After detection, an audio signal as shown in FIG. 2d appears from the receiver 2 in the station B. This signal is applied directly to input terminal 4a of the composite audio signal output circuit 4 and is also applied to the input terminal 3a of the audio delay element 3 to be delayed by the delay time corresponding to the pulse interval TrB (=TtA) shown in FIG. 2c. Thus, this delayed signal is applied to the circuit 4 in the period of time corresponding to the pulse width TtB (=TrA). As a result, the output of the speaker 6 in the station B is as shown in FIG. 2e and is quite analogous to the original audio input applied to the microphone 7 in the station A. It will thus be seen that simultaneous telecommunication between the stations A and B can be attained under automatic switch-over by the time division pulses of low frequency, and yet this intelligibility of the reproduced audio information is quite satisfactory.

It is apparent that the operation is entirely the same as that above described in the case of signal transmission from the station B to the station A. In this case, however, the transmitter 9 in the station B is turned on during the period of time corresponding to the pulse width TtB (=TrA) shown in FIG. 2c, and the receiver 2 in the station A is turned on during the same period of time.

Figure 3:
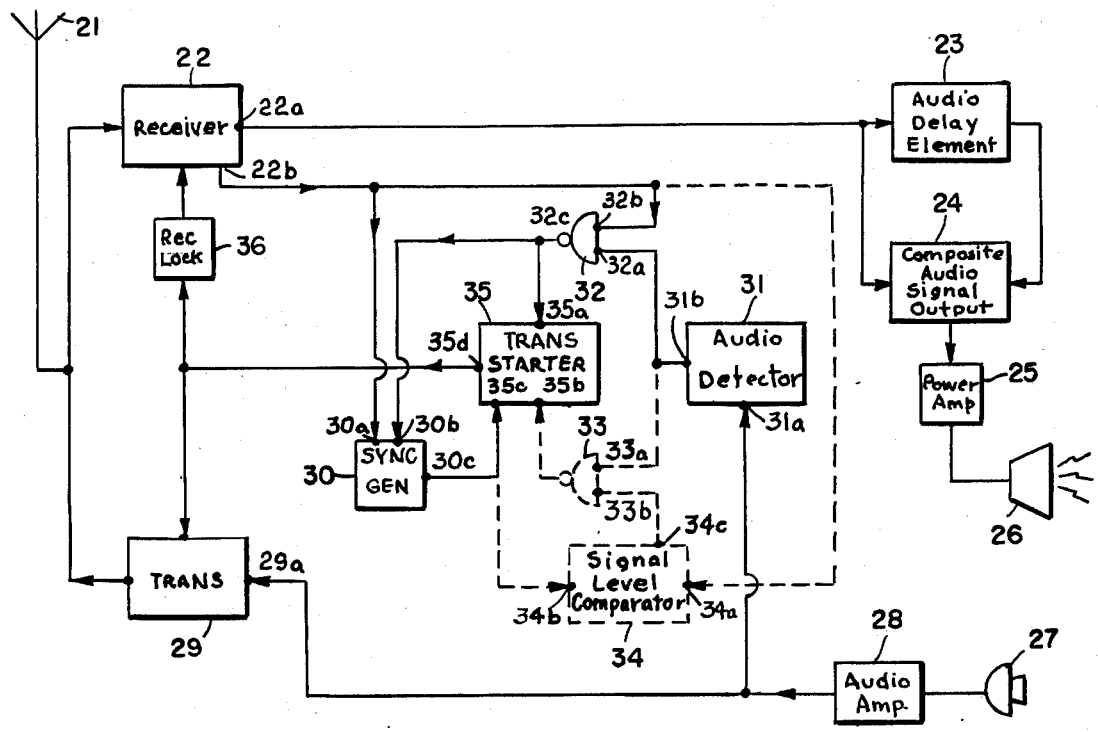
FIG. 3 is a block diagram of another preferred embodiment of the present invention having voice control means and shows the structure of the radio communication system in one station.

FIG. 3 shows another preferred embodiment of the present invention. The circuit shown in FIG. 1 is utilized in FIG. 3, and therefore, the circuit shown in FIG. 3 includes an antenna 21, a receiver 22, an audio delay element 23, a composite audio signal output circuit 24, a power amplifier 25, a speaker 26, a microphone 27, an audio amplifier 28, a transmitter 29, a synchronizing pulse generator 30 and a transmitter starter circuit 35. This synchronizing pulse generator 30 and transmitter starter 35 is substantially similar to the combination of the synchronizing circuit 10 and the transmitter-receiver controller 11 shown in FIG. 1. The output terminal of the audio amplifier 28 for amplifying the audio signal output of the microphone 27 is connected to the input terminal 29a of the transmitter 29 and to the input terminal 31a of an audio detector 31. This audio detector 31 includes therein an amplifier, a rectifier and means for detecting the presence or absence of the output of the audio amplifier 28, and a digital signal of high or low level appears at the output terminal 31b of the audio detector 31. The output terminal 31b of this audio detector 31 is connected to one input terminal 32a of a first NAND gate 32 and to one input terminal 33a of a second NAND gate 33.

The squelch circuit or AGC circuit in the receiver 22 is connected to one input terminal 30a of the synchronizing pulse generator 30, to the other input terminal 32b of the first NAND gate 32, and to one input terminal 34a of a received signal level comparator 34. The output terminal 30c of the sychronizing pulse generator 30 is connected to the other input terminal 34b of the comparator 34. Thus, the output signal of the squelch circuit or AGC circuit in receiver 22 appearing in response to the transmitted signal reception and the clock pulse output of the synchronizing pulse generator 30 are applied to the comparator 34, and a digital signal appears from the comparator 34 as a result of an "AND" operation. In other words, the comparator 34 in each of the stations A and B has a function of judging as to whether the signal appearing in the period of time corresponding to the pulse width of the time division pulse signal is the true signal transmitted from one to the stations and received by the other. However, this comparator 34 is not an indispensable element since the possibility of mixing of noise of level equivalent to the signal level into the transmitted signal is negligible as a matter of fact. This comparator 34 may have an additional function of detecting impossibility of audio information transmission due to the static or internal noises. In other words, the comparator 34 may detect the level of the static or internal noises and may act to cease the operation of a transmitter starter 35 and to hold the system in the receiving mode when the static or internal noise level is so excessive that satisfactory transmission of the audio signal is not possible. While provision of the comparator 34 in the radio communication system is preferable for the above reason, the circuit is not essential to the system operation, and various factors including the increased complexity of the circuit and the increase in the equipment cost are to be taken into consideration in evaluating the use thereof.

With reference once more to FIG. 3, the system which includes comparator 34 is now set forth. More specifically, the output terminal 34c of the comparator 34 is connected to the other input terminal 33b of the second NAND gate 33. The output terminals of the NAND gates 32 and 33 are connected to the input terminals 35a, 35b respectively of the transmitter starter 35. The transmitter starter 35 is driven when the outputs of these NAND gates 32 and 33 are applied simultaneously thereto. When the transmitter starter 35 is thus driven, the clock pulse signal output of the synchronizing pulse generator 30 energizes the counter in the transmitter starter 35.

The output terminal 32c of the first NAND gate 32 is further connected to the in-put terminal 30b of the synchronizing pulse generator 30. The output terminal 35d of the transmitter starter 35 is connected to the transmitter 29 directly and to the receiver 22 through a receiver locking means 36 such as an inverter. More specifically, the output terminal 35d of the transmitter starter 35 is connected to the frequency multiplier in the transmitter 29, and the output of inverter 36 is connected to the high-frequency amplifying stage of the receiver 22.

Figure 4:
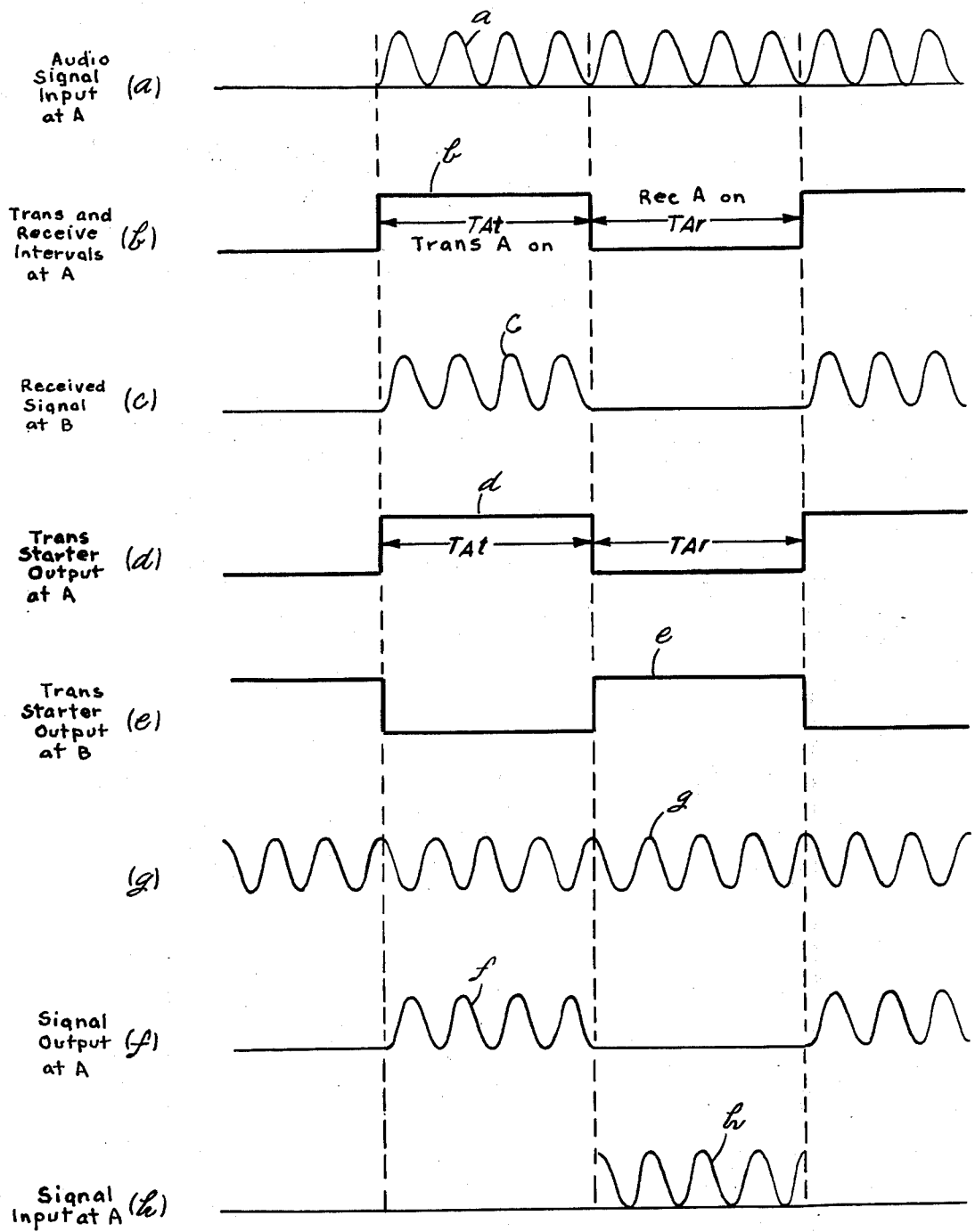
FIG. 4 is a simplified time chart illustrating the operation of the system shown in FIG. 3.

The operation of the system shown in FIG. 3 will be described with reference to FIG. 4. It is initially noted that transmitter starter 35 in the stations A and B generate time division pulses in synchronous relation. For example, in response to the application of an audio signal to the transmitter 29 in the station A, the transmitter starter 35 in the station A generates a time division pulse output by being triggered by the output of the audio detector 31 applied through the first NAND gate 32. The transmitter starter 35 in the station B is driven in response to the application of the output signal of the squelch circuit or AGC circuit in the receiver 22 and generates a time division pulse output which is inverted relative to that generated in the station A. Therefore, the time division pulse input having a pulse width of 10 msec to 100 msec is applied to the received signal level comparator 34 and transmitter starter 35 in response to the detection of a transmitted or received audio signal.

Now, the operation of the system will be described with reference to the case in which the systems in the stations A and B are placed in the transmitting mode and receiving mode respectively. An audio signal a as shown in FIG. 4a appearing from the microphone 27 in the station A is applied after amplification to the transmitter 29 and audio detector 31. As a result, a digital signal of level different from the previous level appears from the audio detector 31 to be applied to input terminals 32a, 33a of each of the first and second NAND gates 32 and 33 respectively. Due to the fact that no audio signal (modulated signal) is being transmitted from the station B to the station A at this time, the NAND gates 32 and 33 in the station A are opened to drive the transmitter starter 35. Therefore, the time division pulse b shown in FIG. 4B is applied from the transmiter starter 35 to the transimtter 29 and receiver locking means 36, and the transmtter 29 is energized during the transmitting period of time TAt to transmit the signal from the antenna 21. During this period of time, the receiver 22 in the station A is kept in the locked state. The transmitter 29 in the station A is deenergized during the next or receiving period of time TAr in the time division pulse signal b, and the output signal of the receiver locking means 36 is inverted to energize the receiver 22 in turn. In this case, however, no audio signal (modulated signal) from the station B is received by the receiver 22 in the station A since the station B is not transmitting such signal.

The radio communication system in the station B is not placed in the transmitting mode but in the receiving mode as above described. Thus, no audio signal input is applied to the audio detector 31, and the transmitter starter 35, would not operate unless an audio signal is applied from the microphone 27 even when the synchronizing pulse generator 30 is generating the clock pulses. In response to the application of the audio signal transmitted in time division fashion from the antenna 21 in the station A to the receiver 22 in the station B, the received signal shown in FIG. 4c is applied to the composite audio signal output circuit 24 directly and to the audio delay element 23 to be delayed by a predetermined delay time, and this delayed signal is then applied to the circuit 24 to provide a composite audio signal in a manner as described with reference to the first embodiment.

The operation of the system will next be described with reference to the case in which radio communication is carried out alternately between the stations A and B. In this case, the transmitter starters 35 in both the station A and the station B are under operation, and the time division pulse signals d and e shown in FIGS. 4D and 4e appear from the transmitter starters 35 in the stations A and B respectively. When an audio signal a as shown in FIG. 4a appears from the microphone 27 in the station A, this audio signal a is applied through the audio amplifier 28 to the transmitter 29 and audio detector 31. Since no audio signal is being transmitted from the station B, the digital output signal of the audio detector 31 in the station A triggers the transmitter starter 35 through the NAND gate 32. The time division pulse d appearing from the transmitter starter 35 is applied to the receiver 22 through the receiver locking means 36 to lock the receiver 22 during the period of time corresponding to the pulse width TAt, and the signal f shown in FIG. 4F is transmitted from the transmitter 29 through the antenna 21. During the period of time TAr in the time division pulse signal d, the transmitter 29 is deenergized and the receiver 22 is energized in turn. Thus, the receiver 22 receives a signal 4 as shown in FIG. 4b transmitted from the station B during the corresponding period of time in the time division pulse signal e shown in FIG. 4e. FIG. 4g shows the waveform of the audio signal output appearing from the microphone 27 in the station B. The audio signal received by the receiver 22 in the station A is applied to the speaker 26 after being passed through the audio delay element 23 and composite audio signal output circuit 24 in the manner described hereinbefore.

The radio communication system in the station B operates in entirely the same manner as that in the station A except that the time division pulse signal e is inverted relative to the time division pulse signal d. That is, the radio communication system in the station B is in the receiving mode when that in the station A is in the transmitting mode, and the radio communication system in the station A is in the receiving mode when that in the station B is in the transmitting mode. The radio communication systems in the stations A and B operate in the manner above described so long as audio information are continuously exchanged between the stations A and B. However, when a pause occurs in the audio signal being transmitted from at least one of the stations A and B, the transmitter starter 35 in that station is deenergized, and the radio communication system in this specific station is held in the receiving mode. In this manner, the radio communication system in any one of the stations A and B is held in the receiving mode unless the audio signal input is applied to the audio detector from the microphone. When such input is applied to the audio detector in each station, the transmitter and receiver are alternately turned on and off by the time division pulse signal. Even when audio information are applied simultaneously to the microphones in both the stations A and B, sychronization is attained in such a manner that the radio communication system in one of the stations is placed in the transmitting mode and that in the other station is placed in the receiving mode.

It is to be added hereto that the broken lines shown in FIG. 3 designate the wiring associated with the received signal level comparator 34, and such portions are apparently unnecessary when the comparator 34 is eliminated.

We claim:

1. In a radio communication system for effecting simultaneous telecommunication between a first and a second station each including a transmitter and a receiver and using a carrier of a single frequency which carries audio signals, at least one of said stations comprising first means for providing a pulse train comprised of a series of time division pulse signals, each of which pulse signals has a predetermined time interval of from 10 msec. to 100 msec., controller means for enabling said receiver to output the audio signals received during the time interval of certain ones of said pulse signals in said series, output means for said receiver over which said audio signals are provided, delay means connected to said output means for delaying said audio signals for a predetermined time, and composite signal means connected to said output means and said delay means for providing a composite signal which is comprised of the audio signals as output by said receiver in a time interval successively followed by the same audio signals as delayed by said delay means for said predetermined time, and means for coupling said composite signal to associated audio signal reproducing means for reproduction purposes.

2. A radio communication system as set forth in claim 1 in which said certain ones of said pulse signals comprise alternate ones of said time division pulse signals in said pulse train, whereby said audio signals as output by said receiver are discontinuous signals, and in which said delay means is operative to delay said audio signals received during one of said alternate pulses for a time interval which is equal to the duration of one of said alternate pulse signals, whereby a composite signal is provided which comprises the received audio signal which is output by said receiver means during one time interval followed by the same audio signal as delayed by said delay means.

3. A radio communication system as set forth in claim 1 in which said controller means is operative to enable said transmitter at said one station during the intervals of pulse signals in said pulse train other than said certain pulse signals.

4. A radio communication system as set forth in claim 3 which includes input means for applying audio signals to said transmitter, and in which said receiver is enabled in the receiving mode in the absence of audio signals on said input means to said transmitter.

5. A system as set forth in claim 3 in which said controller means includes a first output means for connecting said certain pulse signals to said receiver, and a second output for connecting the other pulse signals to said transmitter, and in which said certain and said other pulse signals are of equal time duration and inverted one relative to the other.

6. A radio communication system as set forth in claim 1 in which said delay means is a bucket brigade device.

7. A radio communication system as set forth in claim 1 in which said first means at said first station outputs one of said certain pulses in response to the initial receipt of audio signals from said other station, and outputs one of said other pulses in the following pulse interval when the transmission of audio signals from said other station is interrupted, whereby said one station is placed in the receiving mode whenever said other station is in the transmitting mode and is prepared for the transmitting mode whenever said other station is in the receiving mode.

8. A radio communication system as set forth in claim 1 in which the other station includes receiver means, and sync means for generating time division pulse signals of the same predetermined pulse width as said first means at said one station, and controller means for enabling said receiver means at said other station to output audio signals during the period of receipt of audio signals transmitted by said one station, whereby the other station is placed in the receiving mode for the interval during which the one station is in the transmitting mode, and in which said controller means at said other station prepares its transmitter for the transmit mode during the succeeding pulse interval during which the one station is not transmitting audio signals.

9. A radio communication system as set forth in claim 1 which includes, input means for applying audio signals to said transmitter, and in which said controller means includes audio detector means for detecting said audio signals, transmitter starter means, and control means for enabling said transmitter starter means in response to detection of an audio signal on said input means by said audio detector means.

10. A radio communication system as set forth in claim 9 in which said control means is operative to inhibit operation of said transmitter starter means during the interval of said certain one of said pulse signals.

11. A radio communication system as set forth in claim 9 which includes receiver lock means controlled by said transmitter starter means, and in which said first means outputs pulse signal other than said certain pulse signals after one of said certain pulse signals to enable said transmitter starter means to control said receiver lock means to lock said receiver for the interval of said other pulse;

12. A radio communication system as set forth in claim 9 which includes receiver lock means, and in which said transmitter starter means at said first station is controlled responsive to audio signals input to said transmitter to enable said first means to generate one pulse signal other than said certain signals, and to simultaneously control said receiver lock means to lock out the receiver at said one station, whereby the one station is placed in the transmitting mode for the interval of said one other pulse, and in which said first means controls said transmitter starter means to disable said transmitter during the interval of the next pulse output by said first means, and to simultaneously control said receiver lock means to unlock said receiver whereby said one station is placed in the receiving mode for the interval of said next pulse.

13. In a radio communication system for effecting simultaneous telecommunication between a first and a second station each including a transmitter and a receiver and using a carrier of a single frequency which carries audio signals, at least one of said stations comprising first means for providing a pulse train comprised of a series of time division pulse signals, each of which pulse signals occurs in a predetermined time interval, controller means for enabling said receiver to output the audio signals received during the interval of certain ones of said pulse signals in said series, output means for said receiver over which said audio signals are provided, delay means connected to said output means for delaying said audio signals for one time interval, composite signal means connected to said output means and said delay means for providing a composite signal comprised of the audio signals as output by said receiver in a time interval followed by the same audio signals as delayed by said delay means, a transmitter input means for applying audio signals to said transmitter, said controller means including audio detector means for detecting said audio signals, transmitter starter means, control means for enabling said transmitter starter means in response to detection of an audio signal on said input means by said audio detector means, a signal level comparator having a first input connected to the output of said receiver, a second input connected to an output of said first means, and gate means for enabling said transmitter starter means only in response to receipt of an enabling signal by said signal level comparator over each of said first and second input circuits.

14. In a radio communication system for effecting simultaneous telecommunication between a first and a second station each including a transmitter and a receiver and using a carrier of a single frequency which carries audio signals, at least one of said stations comprising first means for providing a pulse train comprised of a series of time division pulse signals, each of which pulse signals occurs in a predetermined time interval, said pulse signals of said pulse train having a repetition frequency which is within the audio frequency range, controller means for enabling said receiver to output the audio signals received during the interval of certain ones of said pulse signals in said series, output means for said receiver over which said audio signals are provided, delay means connected to said output means for delaying said audio signals for one time interval, and composite signal means connected to said output means and said delay means for providing a composite signal comprised of the audio signals output by said receiver in one time interval followed by the same audio signals as delayed by said delay means, whereby two sets of identical audio signals appear successively as a composite signal, and means for coupling said composite signal to audio reproducing means for reproduction purposes.

* * * * *